(12) United States Patent
Sotowa et al.

(10) Patent No.: US 8,841,029 B2
(45) Date of Patent: Sep. 23, 2014

(54) NEGATIVE ELECTRODE FOR LITHIUM SECONDARY BATTERY, METHOD FOR PRODUCING CARBON-BASED NEGATIVE ELECTRODE ACTIVE MATERIAL, LITHIUM SECONDARY BATTERY AND USE THEREOF

(75) Inventors: Chiaki Sotowa, Kanagawa (JP); Akinori Sudoh, Kanagawa (JP); Masataka Takeuchi, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 528 days.

(21) Appl. No.: 12/673,455

(22) PCT Filed: Aug. 8, 2008

(86) PCT No.: PCT/JP2008/064343
§ 371 (c)(1),
(2), (4) Date: Apr. 22, 2010

(87) PCT Pub. No.: WO2009/022664
PCT Pub. Date: Feb. 19, 2009

(65) Prior Publication Data
US 2011/0236767 A1      Sep. 29, 2011

(30) Foreign Application Priority Data

Aug. 10, 2007  (JP) ................................. 2007-208853

(51) Int. Cl.
| | | |
|---|---|---|
| *H01M 4/58* | (2010.01) | |
| *H01M 4/133* | (2010.01) | |
| *H01M 4/1393* | (2010.01) | |
| *H01M 4/04* | (2006.01) | |
| *H01M 4/587* | (2010.01) | |
| *H01M 4/02* | (2006.01) | |

(52) U.S. Cl.
CPC ........ *H01M 4/133* (2013.01); *H01M 2004/021* (2013.01); *H01M 4/1393* (2013.01); *H01M 4/0471* (2013.01); *Y02E 60/122* (2013.01); *H01M 4/587* (2013.01)
USPC ..................................... 429/231.8; 429/218.1

(58) Field of Classification Search
CPC ....................................................... H01M 4/587
USPC ................ 429/122–347, 218.1, 231.7, 231.8; 29/623.1–623.5
See application file for complete search history.

(56) References Cited

U.S. PATENT DOCUMENTS

| | | | |
|---|---|---|---|
| 5,993,997 A | 11/1999 | Fujimoto et al. | |
| 2007/0275302 A1* | 11/2007 | Sotowa et al. | ................ 429/217 |
| 2009/0242849 A1* | 10/2009 | Sudoh et al. | .................. 252/502 |
| 2010/0221543 A1 | 9/2010 | Sudoh et al. | |

FOREIGN PATENT DOCUMENTS

| | | |
|---|---|---|
| EP | 0205856 | 12/1986 |
| EP | 0713258 | 5/1996 |
| GB | 1354205 | 6/1974 |
| JP | 63-121259 A | 5/1988 |
| JP | 4-322056 A | 11/1992 |
| JP | 2001-135317 A | 5/2001 |
| JP | 2002-075451 A | 3/2002 |
| JP | 2005-135905 A | 5/2005 |
| JP | 2005-317554 A | 11/2005 |
| JP | 2007-019257 A | 1/2007 |
| JP | 2007-172901 A | 7/2007 |
| JP | 2007-265831 A | 10/2007 |
| WO | 2005067081 | 7/2005 |
| WO | WO 2005067081 A1 * | 7/2005 |
| WO | WO 2007066673 A1 * | 6/2007 |

OTHER PUBLICATIONS

Merriam-Webster, Definition of Coke, printed Aug. 9, 2012.*
EP Communication for EP 08827284 dated Sep. 3, 2012, and Supplementary European Search Report dated Aug. 28, 2012.
Notice of Reasons for Rejections for JP 2009-528119 dated Mar. 15, 2013.
International Search Report with a mailing date of Oct. 21, 2008 for corresponding International Application No. PCT/JP2008/064343.

* cited by examiner

*Primary Examiner* — Jonathan G Leong
(74) *Attorney, Agent, or Firm* — Sughrue Mion, PLLC

(57) ABSTRACT

Disclosed are a negative electrode for lithium secondary batteries, containing an active material (A) capable of absorbing/desorbing lithium ions and a binder (B), wherein the active material (A) is a carbon-based material obtained from at least one starting material selected from a group consisting of petroleum cokes and coal cokes and having a mean particle size of from 1 to 30 and a true density of from 1.90 to 2.00 g/cm$^3$ and its use; and a method for producing a carbon-based negative electrode active material having a mean particle size of from 1 to 30 μm and a true density of from 1.90 to 2.00 g/cm$^3$, the method comprising (a) a step of grinding at least one selected from a group consisting of petroleum cokes and coal cokes, (b) a step of controlling the particle size, and (c) a step of heat-treating in an inert gas atmosphere at 900 to 1900° C.

10 Claims, No Drawings

NEGATIVE ELECTRODE FOR LITHIUM SECONDARY BATTERY, METHOD FOR PRODUCING CARBON-BASED NEGATIVE ELECTRODE ACTIVE MATERIAL, LITHIUM SECONDARY BATTERY AND USE THEREOF

CROSS REFERENCE TO RELATED APPLICATIONS

This application is a National Stage of International Application No. PCT/JP2008/064343 filed Aug. 8, 2008, claiming priority based on Japanese Patent Application No. 2007-208853, filed Aug. 10, 2007, the contents of all of which are incorporated herein by reference in their entirety.

TECHNICAL FIELD

The present invention relates to a carbon-based negative electrode for secondary batteries that gives a lithium secondary battery having a large discharge capacity, excellent in charge property with large current, especially excellent in receptability of lithium ions, and having a discharge property, to a method for producing a carbon-based negative electrode active material for use for it, and to a lithium secondary battery comprising the carbon-based negative electrode and its use.

BACKGROUND ART

A lithium secondary battery produces electric energy through oxidation/reduction reaction in intercalation/deintercalation of lithium ions in and from the positive electrode and the negative electrode thereof. The lithium secondary battery uses a substance enabling reversible intercalation/deintercalation of lithium ions as the active material of the positive electrode and the negative electrode thereof, in which an organic electrolytic solution or a polymer electrolyte is filled between the positive electrode and the negative electrode.

Lithium secondary batteries have become widely used as power supplies for mobile telephones and mobile electronic appliances, as having a high energy density and lightweight as compared with conventional secondary batteries. In those days when lithium secondary batteries were first put on the market, there were various problems of insufficient battery capacity, insufficient charge-discharge cycle property and insufficient large-current load property. Afterwards, improvement of battery-constitutive materials has promoted considerable improvement of battery characteristics, therefore supporting the high performance of recent mobile electronic appliances. Nowadays, application of lithium secondary batteries to electric power tools, electric vehicles and others that especially require a large-current load property has been promoted. Further, investigation of lithium secondary batteries as power sources for vehicles and heavy machinery is actively made. In these use applications, the batteries are required to have charge characteristics along with discharge characteristics, or that is, the ability of rapid charging within a short period of time.

In that situation, in Patent Reference 1 (JP-A 2005-135905), heat treatment of a readily-graphitizable carbon material at 1700 to 2500° C. is investigated. Patent Reference 2 (JP-A 2007-19257) discloses a carbon material prepared through heat treatment of a petroleum or coal coke at a relatively low temperature of from 600 to 1400° C., as an electrode material.

DISCLOSURE OF THE INVENTION

Problems that the Invention is to Solve

For improving the large-current load property, approaches to an electrode active material, an electrolytic solution and battery structure planning may be taken into consideration, and various investigations thereon are being made. The problem in large current application is that the resistance inside the battery may increase as the current level is large, therefore failing in sufficient charging or discharging.

As the negative electrode material, heretofore mainly used is a high-crystalline graphite material; however, one serious problem with such a high-crystalline graphite material is that, in charging with a large current with the material, the potential soon reaches 0 V based on lithium and the material could no more receive lithium ions under the large-current condition.

For improving the charge property under a large current, various investigations have been made; and it is known that use of a poorly-crystalline carbon material brings about moderate potential reduction. For example, it is known that a low-crystalline hard carbon prepared by carbonization of a resin has a moderate charge-discharge curve. The material of the type generally has relatively good receptability of lithium ions even in large-current discharging (good charge property), and also has a good discharge property; however, the material must be further improved in point of the charge property thereof.

The material in Patent Reference 1 may be effective for discharge property, but still has a problem in that in large-current discharging, the potential reduction is drastic. Incase where the carbon material having a true density of less than 1.90 g/cm$^3$ described in Patent Reference 2 is used as an electrode material, there occur problems in that the electrode density lowers greatly, and the lithium ions that are kept absorbed inside and could not be desorbed increase, or that is, the initial charge-discharge effective ratio greatly lowers.

Given that situation, it is an object of the present invention to provide a negative electrode for lithium batteries that gives a lithium secondary battery excellent in the large-current charge property and having a good large-current discharge property, and a method for producing a carbon-based active material for use for it. Another object of the present invention is to provide a lithium secondary battery comprising the negative electrode and having the above-mentioned characteristics, and its use.

Means for Solving the Problems

The present inventors have assiduously studied for the purpose of attaining the above-mentioned objects, and as a result, have completed the present invention as described below.

Specifically, the present invention includes the following:

(1) A negative electrode for lithium secondary batteries, containing an active material (A) capable of absorbing/desorbing lithium ions and a binder (B), wherein the active material (A) is a carbon-based material obtained from at least one starting material selected from a group consisting of petroleum cokes and coal cokes and having a mean particle size of from 1 to 30 μm and a true density of from 1.90 to 2.00 g/cm$^3$.

(2) The negative electrode for secondary batteries of (1), further containing vapor-grown carbon fibers as an electro-conductive aid (C).

(3) The negative electrode for secondary batteries of (2), wherein the vapor-grown carbon fibers have a hollow structure and have a fiber diameter of from 5 to 200 nm and an aspect ratio of from 20 to 2000.

(4) The negative electrode for secondary batteries of (1), wherein the specific surface area by the BET method of the active material (A) is from 0.5 to 7.0 m$^2$/g.

(5) The negative electrode for secondary batteries of (1), wherein the active material (A) is one obtained from at least one starting material selected from a group consisting of petroleum cokes and coal cokes and having a non-acicular configuration.

(6) The negative electrode for secondary batteries of (1), wherein the active material (A) is one obtained from at least one starting material selected from a group consisting of petroleum cokes and coal cokes having a coefficient of thermal expansion (CTE) at 30 to 100° C. of from $4.8 \times 10^{-6}$ to $6.0 \times 10^{-6}$/° C.

(7) A method for producing a carbon-based negative electrode active material having a mean particle size of from 1 to 30 μm and a true density of from 1.90 to 2.00 g/cm$^3$, the method comprising (a) a step of grinding at least one selected from a group consisting of petroleum cokes and coal cokes, (b) a step of controlling the particle size, and (c) a step of heat-treating in an inert gas atmosphere at 900 to 1900° C.

(8) The method for producing a carbon-based negative electrode active material of (7), wherein the coefficient of thermal expansion (CTE) at 30 to 100° C. of the petroleum cokes and the coal cokes is from $4.8 \times 10^{-6}$ to $6.0 \times 10^{-6}$/° C.

(9) A lithium secondary battery containing the negative electrode for secondary batteries of any of (1) to (6) as the constitutive element thereof.

(10) The lithium secondary battery of (9) having a non-aqueous electrolytic solution and/or a nonaqueous polymer electrolyte, wherein the nonaqueous solvent for these contains at least one selected from ethylene carbonate, diethyl carbonate, dimethyl carbonate, methylethyl carbonate, propylene carbonate, butylene carbonate and vinylene carbonate.

(11) An electronic device comprising the lithium secondary battery of (9) or (10).

(12) A tool comprising the lithium secondary battery of (9) or (10).

(13) A vehicle comprising the lithium secondary battery of (9) or (10).

According to the present invention, there are provided a negative electrode for lithium batteries that gives a lithium secondary battery excellent in large-current charge property and having a good large-current discharge property, and a method for producing a carbon-based active material for use for it. There are also provided a lithium secondary battery having the negative electrode and having the characteristics mentioned above, and its use.

BEST MODE FOR CARRYING OUT THE INVENTION

[Negative Electrode for Lithium Secondary Battery]

The negative electrode for lithium secondary batteries of a preferred embodiment in the present invention contains an active material (A) capable of absorbing/desorbing lithium ions and a binder (B), wherein the active material (A) may be a carbon-based material obtained from at least one starting material selected from a group consisting of petroleum cokes and coal cokes and having a mean particle size of from 1 to 30 μm and a true density of from 1.90 to 2.00 g/cm$^3$.

(Active Material (A))

When the mean particle size of the active material (A) is too large, then streaks and stripes may occur in forming the negative electrode by coating with a coating liquid for negative electrode formation containing the active material (A) and a binder (B) to a predetermined thickness followed by pressing, and therefore a uniform negative electrode may be difficult to produce. Accordingly, the size may be at most 30 μm.

When the mean particle size is too small, then the flowability of the coating liquid for negative electrode formation may greatly lower and the coating liquid may be difficult to handle; and in addition, in case where the amount of fine particles is large, then the specific surface area of the particles may increase therefore increasing the side reaction thereof with an electrolytic solution as mentioned below.

Accordingly, the mean particle size of the active material (A) may be defined to fall within a range of from 1 to 30 μm, preferably from 1 to 20 μm. The mean particle size is determined as follows: The particle size distribution of the particles is determined according to a laser diffractiometric scattering method, and the particle size with which the cumulative volume to the volume of all the particles is 50% (D50%) is the mean particle size.

When the true density of the active material (A) is small, the negative electrode formed could hardly have a sufficient energy density per volume. In addition, the degree of crystallinity of the carbon-based material having such a low true density is extremely low, and therefore the proportion of the lithium ions that have been absorbed by the active material and are kept remaining therein not desorbed in discharging may increase. Accordingly, the true density may be at least 1.90 g/cm$^3$.

On the other hand, when the true density is high, the energy density per volume can increase and the degree of graphite crystallization may be high, and therefore the proportion of lithium ions kept remaining in the active material (A) may be small. However, there is a problem in that the capacity enabling large-current discharging may rapidly decrease, and the true density may be at most 2.00 g/cm$^3$.

Accordingly, the true density of the active material (A) may be defined to fall within a range of from 1.90 to 2.00 g/cm$^3$.

Preferably, the true density of the active material (A) is measured according to a vapor-phase substitution method. The method is as follows: In an environment kept at a predetermined temperature, the true density is computed from the volume of helium gas accounting for a predetermined volume. As the device for the measurement, usable is Yuasa Ionics' Ultrapycnometer 1000.

Regarding the physical properties of the negative electrode active material (A), when the specific surface area thereof is too large, then the side reaction with an electrolytic solution to be mentioned below may be promoted with a risk of accelerating the deterioration of batteries. The specific surface area is preferably at most around 7 m$^2$/g, more preferably at most 5 m$^2$/g. On the other hand, when the specific surface area is too small, then the active material could not have satisfactory properties; and therefore, the specific surface area is preferably at least around 0.5 m$^2$/g.

The specific surface area is a value measured according to the BET method using nitrogen gas.

Petroleum cokes and coal cokes used as the starting material for the active material (A) may have different shapes and physical data depending on the production method, etc.; and above all, preferred are those having a non-acicular configuration. "Non-acicular configuration" as referred to herein includes spherical, massive or potato-like configurations, and can be confirmed, for example, with a scanning electronic microscope. On the other hand, "acicular configuration" includes scaly and flaky configurations, and this directly reflects a configuration of a grown graphite crystal of so-called graphene sheets as laminated. The carbon material of an acicular configuration generally has a light gray gloss, but the carbon material of a non-acicular configuration does not have it, and can be therefore differentiated from the former with the naked eye.

Petroleum coke is a black and porous solid residue to be obtained in cracking or cracking distillation of petroleum or bituminous oil. Petroleum coke includes fluid coke and delayed coke depending on the coking method. However, fluid coke is powdery and is almost useless except for use for home fuel in refinery; and petroleum coke generally called so is delayed coke.

Preferably, the petroleum cokes and coal cokes for use as the starting material for the active material (A) has a coefficient of thermal extension (CTE) at 30° C. to 100° C. of from $4.0 \times 10^{-6}$ to $6.0 \times 10^{-6}/°$ C. Those nearer to acicular cokes having a high level of crystal orientation have a smaller value of the coefficient; however, acicular cokes could hardly give the characteristics of the carbon-based negative electrode active material (A).

The coefficient of thermal expansion can be determined according to the following process. 500 g of the starting material is ground into a size of at most 28 meshes; and using a sieve, 60 g of 28 to 60-mesh powder, 32 g of 60 to 200-mesh powder and 8 g of smaller powder than 200-mesh powder are mixed in that ratio. 25 g of a binder pitch is added to the mixture in a stainless container, and heated and uniformly mixed in an oil bath at 125° C. for 20 minutes. The mixture is cooled and ground into a size of at most 28 meshes.

30 g of the ground mixture is put into a pressure-shaping machine at 125° C., and shaped under a gauge pressure of 450 kg/cm$^2$ for 5 minutes. The shaped article is put into a magnetic crucible, and heated from room temperature up to 1000° C. for 5 hours in a firing furnace, then soaked at 1000° C. for 1 hour, and thereafter cooled.

After cooled, the fired article is cut into a size of 4.3×4.3× 20.0 mm to be a test piece, using a precision cutter. The test piece is analyzed for the thermal expansion in the machine direction thereof at 30 to 100° C., using THA (thermal mechanical analyzer; for example, Seiko Instruments' TMA/SS 350).

<Method for Producing Carbon-Base Negative Electrode Active Material>

The active material (A) for use in the negative electrode for secondary batteries of a preferred embodiment in the present invention may be produced in any method capable of producing a negative electrode active material of a carbon-based material having the properties mentioned above, starting from at least one starting material selected from a group consisting of petroleum cokes and coal cokes; however, according to the method of the present invention mentioned below, the intended carbon-based negative electrode active material (corresponding to the active material (A)) can be produced efficiently.

The method for producing the carbon-based negative electrode active material in a preferred embodiment of the present invention comprises (a) a step of grinding at least one selected from a group consisting of petroleum cokes and coal cokes, (b) a step of controlling the particle size, and (c) a step of heat-treating in an inert gas atmosphere at 900 to 1900° C., thereby producing a carbon-based negative electrode active material having a mean particle size of from 1 to 30 µm and a true density of from 1.90 to 2.00 g/cm$^3$.

In the production method of the preferred embodiment in the present invention, first at least one selected from a group consisting of petroleum cokes and coal cokes is ground with a grinder in the step (a), and then the particle size distribution is controlled through pneumatic classification or using a sieve in the step (b). Grinding and classification may be attained after the heat treatment of the next step (c); however, when the operation is attained after the heat treatment, there may be a possibility of greatly increasing the specific surface area; and therefore, it is preferably attained before the heat treatment.

The heat treatment may be attained at 900 to 1900° C. The heat treatment temperature may be an important condition for defining the true density and the degree of graphite crystallization of the active material; and when the temperature is low, the true density may be low, but when the temperature is high, the true density may be high. For attaining the above-mentioned true density, the heat treatment temperature may be defined to fall within a range of from 900 to 1900° C., preferably from 900 to 1500° C.

During the heat treatment, when a large quantity of oxygen exist in the heat-treatment furnace, then the active material may be oxidized, and therefore, preferably, the heat treatment is attained in an inert gas atmosphere.

The petroleum cokes and/or coal cokes for use in the present invention can be produced in any conventional known methods. For example, a petroleum heavy oil and/or a coal heavy oil are heat-treated under a pressure of at most around 2.0 MPa, at a temperature of from 400 to 600° C. or so for around 3 hours.

(Binder (B))

The binder (B) for use in the negative electrode for lithium secondary batteries in a preferred embodiment of the present invention is not specifically defined, and may be selected from any conventional materials that are known as a binder for negative electrodes for lithium secondary batteries. Preferred examples of the binder include, for example, fluorine-containing high-molecular polymers such as polyvinylidene fluoride (PVDF), vinylidene fluoride/hexafluoropropylene copolymer, vinylidene fluoride/chlorotrifluoroethylene copolymer, vinylidene fluoride/tetrafluoroethylene copolymer, etc.; and styrene-butadiene copolymer rubber (SBR), etc.

The content of the binder (B) in the negative electrode is, in case where PVDF is used as the binder (B), preferably within a range of from 0.5 to 20 parts by mass relative to 100 parts by mass of the electrode active material (A) from the viewpoint of keeping the electroconductivity good and sufficiently exhibiting the function of the binder, more preferably within a range of from 1 to 10 parts by mass. On the other hand, in case where SBR is used as the binder (B), the content thereof is preferably within a range of from 0.5 to 5 parts by mass relative to 100 parts by mass of the electrode active material (A) from the viewpoint of keeping the electroconductivity good and sufficiently exhibiting the function of the binder, more preferably within a range of from 0.5 to 3 parts by mass.

(Electroconductive Aid (C))

The negative electrode for lithium secondary batteries of a preferred embodiment of the present invention may further contain an electroconductivity aid (C) for giving lithium secondary batteries excellent in the large-current charge property and having a good large-current discharge property. As the electroconductivity aid (C), usable are known carbon-based materials such as acetylene black, furnace black, ketjen black, artificial graphite powder, carbon fibers, etc.; and in particular, use of vapor-grown carbon fibers brings about a great effect.

Vapor-grown carbon fibers may be produced, for example, according to a method of introducing a gasified organic compound into a system along with iron serving as a catalyst thereinto in a high-temperature atmosphere. The crystal growth direction of the vapor-grown carbon fibers is nearly parallel to the fiber axis, and many of them have a hollow structure in the center part thereof.

The vapor-grown carbon fibers for use herein may be any of those directly produced as they are (the fibrous ones produced according to the above-mentioned method but not processed any more), or those processed for graphitization by heat treatment at around 800 to 1500° C., or heat-treated at 2000° C. or higher (preferably at around 2000 to 3000° C.). Preferred are those suitable to the negative electrode active material (A) to be used and to the battery design; and those processed by heat treatment and further those processed for graphitization are more preferred as having a higher degree of carbon crystallinity and having a higher level of electroconductivity.

Also preferred are those having a hollow structure in the center of the fiber in such a manner that the crystal structure inside the fiber has a ring structure like yearly growth rings of wood. Having the crystal structure of the type, the vapor-grown carbon fibers could have excellent electroconductivity in the axial direction of the fibers.

The thickness of the fibers (fiber diameter) and the aspect ratio thereof have significant influences on the dispersibility of the vapor-grown carbon fibers; and therefore, preferably, the fiber diameter is from 5 to 200 nm and the aspect ratio is from 20 to 2000. More preferably, the fiber diameter is from 50 to 200 nm.

For increasing the degree of crystallinity, graphitization may be effectively promoted by mixing a graphitization promoter, boron in the system prior to graphitization. The boron source is not specifically defined, and for example, a powder of boron oxide, boron carbide, boron nitride or the like may be mixed in the vapor-grown carbon fibers prior to graphitization, whereby the degree of crystallinity can be readily increased. In this stage, boron to remain in the vapor-grown carbon fibers is preferably from 0.1 to 4,000 ppm. When the remaining boron is at least 0.1 ppm, then the effect of increasing the degree of crystallinity can be readily attained; and when it is at most 4,000 ppm, then the amount of boron that may exist as a low-electroconductivity compound not contributing toward crystallization promotion may be reduced and the electroconductivity of the vapor-grown carbon fibers may be thereby increased.

As one preferred embodiment of vapor-grown carbon fibers, there are known branched fibers. The branched part has a hollow structure via which the fibers communicate with each other including the part; and the carbon layer constituting the cylindrical part of the fibers is continuous. The hollow structure has a cylindrical structure formed of a wound carbon layer, and includes one not completely cylindrical, one having a partially cut part, one where two laminated carbon layers bond together to be one layer, etc. The cross section of the cylindrical form is not limited to a complete circle but may include an oval form or a polygonal form.

Many vapor-grown carbon fibers may be roughened or disordered on the fiber surface, and therefore have the advantage of enhanced adhesiveness to the negative electrode active material (A). Having the enhanced adhesiveness, the negative electrode active material (A) and the vapor-grown carbon fibers may keep a good adhesion state with no dissociation therebetween, and the cycle life can be prolonged with keeping the electroconductivity of the negative electrode.

In case where the vapor-grown carbon fibers contain many branched fibers, a network can be formed more efficiently in the negative electrode. Since the network between the negative electrode active material particles can be kept good, the flexibility of the negative electrode as a whole can be enhanced.

In the negative electrode for lithium secondary batteries of a preferred embodiment of the present invention, the content of the electroconductivity aid (C) is preferably from 0.5 to 20% by mass, more preferably from 0.5 to 10% by mass. When the content of the electroconductivity aid (C) is at least 0.5% by mass, then the negative electrode can exhibit its good electroconductivity-retaining effect and the electrode properties such as the cycle life can be prevented from being worsened; and when the content is at most 20% by mass, then the current density of the negative electrode can be prevented from lowering and the coatability of the coating liquid for negative electrode formation in forming the negative electrode can be prevented from worsening.

(Formation of Negative Electrode for Lithium Secondary Batteries)

There is no specific limitation on the production of the negative electrode for lithium secondary batteries in a preferred embodiment of the present invention; and any method may be suitably selected from conventional methods known for production of negative electrodes for secondary batteries containing a carbon-based negative electrode active material, a binder, a carbon-based electroconductivity aid, etc. For example, herein employable is a method including a step of preparing a coating liquid for negative electrode formation and a coating step mentioned below.

<Step of Preparing Coating Liquid for Negative Electrode Formation>

The step of preparing a coating liquid for negative electrode formation is a step of preparing a coating liquid for negative electrode formation by mixing and kneading a solution or a dispersion containing the active material (A) or a mixture of the active material (A) and the electroconductive aid (C) mentioned above, and the binder (B) mentioned above, and optionally a solvent.

The solvent (including "dispersion medium") for use in preparing the solution containing the binder (B) is not specifically defined, for which one or more may be selected from solvents heretofore used in formation of the negative electrode in lithium secondary batteries. The solvents include, for example, N-methyl-2-pyrrolidone (NMP), methyl ethyl ketone, dimethylformamide, dimethylacetamide, N,N-dimethylaminopropylamine, tetrahydrofuran, etc. In particular, in case where PVDF is used for the binder (B), then the solvent is preferably N-methyl-2-pyrrolidone.

Apart from the above-mentioned solvents, those mentioned in the above may also be used as a solvent to be added for making the solution Plowable; and in addition, water may also be used.

On the other hand, in case where SBR is used as the binder (B), N-methyl-2-pyrrolidone or water may be used as the solvent to prepare a solution containing SBR. In case where water is used as the solvent, preferably, an aqueous solution of a thickener is put into the mixing kneader before the aqueous dispersion of SBR is put thereinto to mix therein the above-mentioned component (A) or a mixture of the component (A) and the component (C), thereby making the resulting slurry viscous.

The thickener includes, for example, polyethylene glycols, celluloses, polyacrylamides, poly-N-vinylamides, poly-N-vinylpyrrolidones, etc. Of those, preferred are polyethylene glycols, celluloses such as carboxymethyl cellulose (CMC), etc.; and more preferred is carboxymethyl cellulose (CMC) having a high affinity to SBR. CMC includes sodium salts and ammonium salts, any of which are usable herein.

The mixing kneader in use for mixing and kneading is not specifically defined and includes, for example, a planetary mixer, a defoaming mixer, a ball mill, a paint shaker, a vibrating mill, a Ledige mixer, etc.

For example, in case where a PVDF solution or a SBR solution with N-methyl-2-pyrrolidone as the solvent therein is used as the solution containing the binder (B), the above-mentioned component (A) or a mixture of the component (A) and the component (C) is mixed and kneaded with the PVDF solution or the SBR solution optionally along with a solvent (preferably NMP), using the above-mentioned mixing kneader, to thereby prepare a coating liquid of slurry for negative electrode formation.

On the other hand, for example, in case where an aqueous SBR dispersion with water as the solvent therein is used as the solution containing the binder (B), first the component (A) or a mixture of the component (A) and the component (C) is mixed with an aqueous solution of the above-mentioned thickener, then the mixture is mixed and kneaded with the aqueous SBR dispersion and optionally with water serving as a solvent, using the above-mentioned mixing kneader, to thereby prepare a coating liquid of slurry for negative electrode formation.

The amount of the solvent to be put into the mixing kneader is preferably so selected that the resulting coating liquid of slurry for negative electrode formation could have a viscosity suitable for coating a collector, for example, a viscosity of preferably from 1,000 to 10,000 mPa·s at 23° C., more preferably from 2,000 to 5,000 mPa·s.

<Coating Step>

The coating step is a step of coating a collector with the coating liquid for negative electrode formation.

For the collector, for example, usable is any conventional known material such as aluminium, nickel, titanium or their alloy, stainless steel, platinum, carbon sheet, etc. The method of coating the collector with the coating liquid for negative electrode formation thereon is not specifically defined, and any conventional known method is employable, for example, a coating method using a doctor blade, a bar coater, etc. The thus-coated electrode sheet is dried in a known method, and then shaped to have a desired thickness and density according to a known method of roll pressing, pressure pressing or the like, thereby producing an electrode for lithium secondary batteries of a preferred embodiment of the present invention.

[Lithium Secondary Battery and its Use]

The lithium secondary battery in a preferred embodiment of the present invention comprises the above-mentioned negative electrode for lithium secondary batteries in a preferred embodiment of the present invention as the constitutive element thereof.

In the lithium secondary battery in a preferred embodiment of the present invention, usable are a nonaqueous electrolytic solution and/or a nonaqueous polymer electrolyte.

(Nonaqueous Electrolytic Solution)

As the nonaqueous electrolytic solution, herein usable is one containing a lithium salt as the solute in a nonaqueous solvent. The lithium salt includes $LiClO_4$, $LiBF_4$, $LiPF_6$, $LiAlCl_4$, $LiSbF_6$, LiSCN, LiCl, $LiCF_3SO_3$, $LiCF_3CO_2$, $LiN(CF_3SO_2)_2$ and the like that are generally known. One or more of these lithium salts may be used either singly or as combined.

As the nonaqueous solvent for use in the nonaqueous electrolytic solution, preferred are organic solvents, for example, ethers such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, ethylene glycol phenyl ether, 1,2-dimethoxyethane, etc.; amides such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, hexamethylphosphorylamide, etc.; sulfur-containing compounds such as dimethyl sulfoxide, sulfolane, etc.; dialkyl ketones such as methyl ethyl ketone, methyl isobutyl ketone, etc.; cyclic ethers such as ethylene oxide, propylene oxide, tetrahydrofuran, 2-methoxytetrahydrofuran, 1,3-dioxolane, etc.; carbonates such as ethylene carbonate, propylene carbonate, etc.; γ-butyrolactone; N-methylpyrrolidone; acetonitrile, nitromethane, etc. Of those, more preferred are ethylene carbonate, diethyl carbonate, dimethyl carbonate, methylethyl carbonate, propylene carbonate, butylene carbonate and vinylene carbonate. One or more of these solvents may be used either singly or as combined.

The concentration of the solute (lithium salt) in the nonaqueous electrolytic solution is preferably from 0.1 to 5 mol/L, more preferably from 0.5 to 3 mol/L.

(Nonaqueous Polymer Electrolyte)

The nonaqueous polymer electrolyte contains a matrix-forming polymer compound, a lithium salt and optionally a plasticizer. The polymer compound includes polyalkylene oxide derivatives such as polyethylene oxide, polypropylene oxide, etc.; polymers containing the derivative; polyvinylidene fluoride, polyhexafluoropropylene, polycarbonate, phosphate polymer, polyalkylimine, polyacrylonitrile, poly(meth)acrylate, polyphosphagen, polyurethane, polyamide, polyester, polysiloxane and the like derivatives; and polymers containing the derivative, etc.

Of the above-mentioned polymer compounds, preferred are those having an oxyalkylene, urethane or carbonate structure in the molecule such as such as polyalkylene oxide, polyurethane, polycarbonate, etc., as highly miscible with various polar solvents and having good electrochemical stability. From the viewpoint of stability, also preferred are those having a fluorocarbon group in the molecule such as polyvinylidene fluoride, polyhexafluoropropylene, etc. These oxyalkylene, urethane, carbonate and fluorocarbon groups may be in one and the same polymer. The number of repetitive groups may be within a range of from 1 to 1000 each, preferably from 5 to 100 each.

On the other hand, the lithium salt may include the same compounds as those exemplified in the description of the nonaqueous electrolytic solution given above. The content of the lithium salt in the nonaqueous polymer electrolyte is preferably from 1 to 10 mol/kg, more preferably from 1 to 5 mol/kg. As the plasticizer, usable are the nonaqueous solvents exemplified in the description of the nonaqueous electrolytic solution given above.

<Method for Producing Lithium Secondary Battery>

A typical method for producing a lithium ion secondary battery and a lithium polymer battery, as the lithium secondary battery in a preferred embodiment of the present invention, is shown below, to which, however, the present invention should not be limited.

First, according to a conventional known method, a positive electrode sheet for lithium secondary batteries is formed, and according to the method described hereinabove for producing a negative electrode for lithium secondary batteries, a negative electrode sheet for lithium secondary batteries is formed. Thus formed, the positive electrode sheet and the negative electrode sheet are worked into a desired shape, and combined and laminated into positive electrode sheet/separator/negative electrode sheet, in which the positive electrode and the negative electrode are kept insulated from each other, and this is cased in a container such as a coin-type, angular, cylindrical, sheet like or the like container. In case where there is a possibility that this would have absorbed moisture or oxygen during lamination and casing, this may be again dried directly as it is under reduced pressure and/or in an inert atmosphere having a low dew point (not higher than −50° C.), and thereafter transferred into an inert atmosphere having a low dew point. Next, a nonaqueous electrolytic solution or a nonaqueous polymer electrolyte is injected into it or applied thereto, and the container is sealed up, thereby constructing a lithium ion secondary battery or a lithium polymer battery.

Here as the separator, usable is any known one; however, from the viewpoint of being thin and having high strength, preferred is polyethylenic or polypropylenic microporous film. The degree of porosity is preferably higher from the viewpoint of the ionic conductivity thereof; however, when too high, the strength may lower and the positive electrode and the negative electrode may be short-circuited. Therefore, in general, the porosity is from 30 to 90%, preferably from 50 to 80%. The thickness is smaller from the viewpoint of the ionic conductivity and the battery capacity; however, when too thin, the strength may lower and the positive electrode and the negative electrode may be short-circuited. Therefore, in general, the thickness may be from 5 to 100 μm, preferably from 5 to 50 μm. Two or more such microporous films may be combined or the microporous film may be combined with any other separator such as a nonwoven fabric or the like.

The lithium secondary battery mentioned above can be used in electronic appliances, tools, vehicles, etc., and for example, it is favorably used in power sources in mobile electronic appliances such as portable telephones, FDA, etc.; electric-power tools, heavy machinery, HEV, electric vehicles, etc. In addition, it is usable as power storage batteries, as combined with a wind generator or photovoltaic generation.

EXAMPLES

The present invention is described in more detail with reference to the following Examples; however, the present invention should not be limited at all by these Examples.

The characteristics were evaluated according to the following methods.
[1] Mean Particle Size of Negative Electrode Active Material:
Using a laser diffractive scattering particle sizer, Microtrack HRA (by Nikkiso), the particle size distribution was determined, and the D50% value was taken as the mean particle size.
[2] True Density of Negative Electrode Active Material:
This was determined according to a vapor-phase substitution method with helium gas, using Yuasa Tonics' Ultrapycnometer 1000.
[3] Specific Surface Area of Negative Electrode Active Material:
This was determined according to a BET method with nitrogen gas, using Yuasa Ionics' NOVA 2200e.
[4] Method of Evaluation of Battery:
(1) Formation of Li Ion Battery Test Cell (Tripolar Cell):
A tripolar cell was produced in the manner mentioned below. The operation mentioned below was carried out in a dry argon atmosphere having a dew point of not higher than −80° C.

In a polypropylene-made screw cap-fitted cell (inner diameter, about 18 mm), an electrode sample for evaluation (diameter, φ16 mm) and a lithium metal foil were attached via a separator (polypropylene-made microporous film (Celgard's Celgard 2400), 25 μm) put therebetween. A reference lithium metal foil was laminated in the same manner via a separator. An electrolytic solution was added thereto to construct a test cell.
(2) Electrolytic Solution:
An electrolyte $LiPF_6$ was dissolved in a mixture of 8 parts by mass of EC (ethylene carbonate) and 12 parts by mass of EMC (ethylmethyl carbonate) in an amount of 1.0 mol/liter.
(3) Large-current Load Test (Discharge Property):
The test cell was charged from a rest potential up to 2 mV with CC (constant current) at 0.22 mA/cm$^2$ (0.1C equivalent), and then switched to CV (constant volt) charging at 2 mV, and when the current value lowered to 12 μA, the charging was stopped.

The cell was CC-discharged from 0.1C equivalent to 2.00 equivalent, and cut off at a voltage of 1.5 V. The discharge capacity in 0.1C equivalent discharge current application was taken as 100%; and the discharge capacity at 1.0C and 2.0C was represented as a capacity retention; and the data were compared with each other.
(4) Large-current Load Test (Charge Property):
The test cell was charged from a rest potential up to 2 mV with CC (constant current), and then switched to CV (constant volt) charging at 2 mV, and when the current value lowered to 12 μA, the charging was stopped. In the CC-charging, the current condition was made to vary from 0.1C to 1.0C. Under each condition, the CC-charge capacity and the CV-charge capacity were summed up, and the proportion of the CC-charge capacity to the total charge capacity was computed to evaluate the charge property.

The cell was CC-discharged at 0.1C equivalent, and cut off at a voltage of 1.5 V. The initial efficiency in Table 1 means the proportion of the discharge capacity to the charge capacity in the first charge-discharge.

The materials used in Examples and Comparative Examples are shown below.
<Vapor-Grown Carbon Fibers>
VGCF: made by Showa Denko
  Mean fiber diameter (from SEM image analysis): 150 nm,
  Mean fiber length (from SEM image analysis): 8 μm,
  Mean aspect ratio: 53,
  Degree of branching (the number of branches per 1 μm of the fiber length was computed through SEM image analysis, and the same shall apply hereinunder): about 0.1 μm,
  X-ray $C_0$ (degree of crystallinity of graphite crystal obtained according to a Gakushin-method): 0.6767 nm,
  Lc (crystallite size): 48.0 nm.
<Binder>
KF-polymer (L#9210): for negative electrode.
  KF-polymer contains PVDF dissolved in NMP(N-methyl-2-pyrrolidone). Product by Kureha.
<Solvent>
NMP(N-methyl-2-pyrrolidone): made by Showa Denko.

Example 1

Petroleum coke (massive) was ground to have a mean particle size of 5 μm, then classified, and heat-treated in an argon atmosphere at 1100° C. for 1 hour to produce a carbon-based negative electrode active material. The specific surface area, the particle size distribution and the true density of the negative electrode active material, and the coefficient of thermal expansion of the petroleum coke are shown in Table 1.

Next, KF-polymer was added to the negative electrode active material in such an amount that PVDF could account for 5% by weight of the total solid content, then NMP was further added thereto and mixed, thereby preparing a coating liquid for negative electrode formation. The coating liquid for negative electrode formation was applied onto a copper foil and dried to produce a negative electrode for lithium secondary batteries. This was used for battery evaluation. The results are shown in Table 1 and Table 2.

Example 2

A negative electrode active material was produced in the same manner as in Example 1, for which, however, the petroleum coke was ground and classified to have a mean particle size of 15 μm. The specific surface area, the particle size distribution and the true density of the negative electrode active material are shown in Table 1.

Next, also in the same manner as in Example 1 but using the negative electrode active material, a negative electrode for lithium secondary batteries was formed. This was used for battery evaluation. The results are shown in Table 1 and Table 2.

Example 3

A negative electrode for lithium secondary batteries was produced in the same manner as in Example 1 but using a mixture of the negative electrode active material obtained in Example 2 and 2% by mass of vapor-grown carbon fibers "VGCF". This was used for battery evaluation. The results are shown in Table 2.

Example 4

A negative electrode active material was produced in the same manner as in Example 1 but using petroleum acicular coke as the starting material. The specific surface area, the particle size distribution and the true density of the negative electrode active material are shown in Table 1.

Next, also in the same manner as in Example 1 but using the negative electrode active material, a negative electrode for lithium secondary batteries was formed. This was used for battery evaluation. The results are shown in Table 1 and Table 2.

Comparative Example 1

Petroleum coke (massive) was ground to have a mean particle size of 5 μm, then classified, and heat-treated in an argon atmosphere at 2200° C. for 1 hour to produce a negative electrode active material. The specific surface area, the particle size distribution and the true density of the negative electrode active material are shown in Table 1.

Next, in the same manner as in Example 1 but using the negative electrode active material, a negative electrode for lithium secondary batteries was formed. This was used for battery evaluation. The results are shown in Table 1 and Table 2.

It is known that the initial efficiency was improved but the charge property at 1.0C greatly worsened.

Comparative Example 2

A negative electrode active material was produced in the same manner as in Comparative Example 1, for which, however, the petroleum coke was ground and classified to have a mean particle size of 15 μm. The specific surface area, the particle size distribution and the true density of the negative electrode active material are shown in Table 1.

Next, in the same manner as in Comparative Example 1 but using the negative electrode active material, a negative electrode for lithium secondary batteries was formed. This was used for battery evaluation. The results are shown in Table 1 and Table 2.

Like in Comparative Example 1, the initial efficiency was improved but the charge property at 1.0C greatly worsened.

Comparative Example 3

Petroleum coke (massive) was ground to have a mean particle size of 15 μm, then classified, and heat-treated in an argon atmosphere at 700° C. for 1 hour to produce a negative electrode active material. The specific surface area, the particle size distribution and the true density of the negative electrode active material are shown in Table 1.

Next, in the same manner as in Example 1 but using the negative electrode active material, a negative electrode for lithium secondary batteries was formed. This was used for battery evaluation. The results are shown in Table 1 and Table 2.

The charge property was 68% at 1.0C and was high; however, the initial efficiency was extremely low. In addition, it is considered that many lithium ions would not be desorbed, as kept absorbed, and the discharge property was poor.

Comparative Example 4

Phenolic resin was ground to have a mean particle size of 10 μm, then classified, and heat-treated in an argon atmosphere at 1100° C. for 1 hour to produce a negative electrode active material.

Next, in the same manner as in Example 1 but using the negative electrode active material, a negative electrode for lithium secondary batteries was formed. This was used for battery evaluation. The results are shown in Table 1 and Table 2.

The charge property was less than 60% at 1.0C, and was insufficient.

TABLE 1

|  | CTE of Starting Material (/° C.) | Heat Treatment Temperature (° C.) | Specific Surface Area (m²/g) | Particle Size Distribution (μm) | | | True Density (g/cm³) | Discharge Capacity (mAh/g) | Initial Efficiency (%) |
| --- | --- | --- | --- | --- | --- | --- | --- | --- | --- |
|  |  |  |  | D10% | D50% | D90% |  |  |  |
| Example 1 | $5.2 \times 10^{-6}$ | 1100 | 4.4 | 2 | 5 | 9 | 1.94 | 345 | 78.5 |
| Example 2 | $5.2 \times 10^{-6}$ | 1100 | 1.6 | 6 | 15 | 25 | 1.92 | 346 | 79.1 |
| Example 4 | $1.8 \times 10^{-6}$ | 1100 | 3.8 | 4 | 8 | 10 | 1.97 | 352 | 72.1 |
| Comparative Example 1 | $5.2 \times 10^{-6}$ | 2200 | 3.8 | 2 | 5 | 9 | 2.20 | 193 | 88.6 |

TABLE 1-continued

|  | CTE of Starting Material (/° C.) | Heat Treatment Temperature (° C.) | Specific Surface Area (m²/g) | Particle Size Distribution (μm) | | | True Density (g/cm³) | Discharge Capacity (mAh/g) | Initial Efficiency (%) |
| --- | --- | --- | --- | --- | --- | --- | --- | --- | --- |
|  |  |  |  | D10% | D50% | D90% |  |  |  |
| Comparative Example 2 | $5.2 \times 10^{-6}$ | 2200 | 0.7 | 7 | 24 | 40 | 2.11 | 203 | 92.9 |
| Comparative Example 3 | $5.2 \times 10^{-6}$ | 700 | 4.2 | 8 | 25 | 37 | 1.87 | 265 | 62.1 |
| Comparative Example 4 | — | 1100 | 4.4 | 3 | 9 | 15 | 1.94 | 229 | 80.8 |

TABLE 2

|  | Charge Property [capacity cc/ (capacity cc + capacity cv)](%) | | | Discharge Property (capacity retention) (%) | | |
| --- | --- | --- | --- | --- | --- | --- |
|  | 0.1 C | 0.5 C | 1.0 C | 0.1 C | 1.0 C | 2.0 C |
| Example 1 | 83 | 76 | 67 | 100 | 95 | 89 |
| Example 2 | 83 | 75 | 67 | 100 | 95 | 89 |
| Example 3 | 89 | 80 | 77 | 100 | 97 | 95 |
| Example 4 | 81 | 70 | 62 | 100 | 96 | 93 |
| Comparative Example 1 | 95 | 84 | 43 | 100 | 98 | 95 |
| Comparative Example 2 | 94 | 83 | 44 | 100 | 97 | 93 |
| Comparative Example 3 | 80 | 76 | 68 | 100 | 93 | 75 |
| Comparative Example 4 | 90 | 68 | 58 | 100 | 97 | 95 |

[Industrial Applicability]

The negative electrode for lithium batteries in a preferred embodiment of the present invention can give a lithium secondary battery having a large discharge capacity, excellent in large-current charge property and having a large-current discharge property. According to the method for producing a carbon-based active material in a preferred embodiment of the present invention, the active material for use for the negative electrode for lithium secondary batteries can be produced efficiently

The invention claimed is:

1. A negative electrode for lithium secondary batteries, containing an active material (A) capable of absorbing/desorbing lithium ions and a binder (B), wherein the active material (A) is a carbon-based material obtained from at least one starting material selected from the group consisting of petroleum cokes and coal cokes and having a mean particle size of from 1 to 30 μm and a true density of from 1.90 to 2.00 g/cm³, wherein the petroleum cokes and coal cokes have a coefficient of thermal expansion (CTE) at 30° C. to 100° C. of from $4.8 \times 10^{-6}$/° C. to $6.0 \times 10^{-6}$/° C.

2. The negative electrode for secondary batteries as claimed in claim 1, further containing vapor-grown carbon fibers as an electroconductive aid (C).

3. The negative electrode for secondary batteries as claimed in claim 2, wherein the vapor-grown carbon fibers have a hollow structure and have a fiber diameter of from 5 to 200 nm and an aspect ratio of from 20 to 2000.

4. The negative electrode for secondary batteries as claimed in claim 1, wherein the specific surface area by the BET method of the active material (A) is from 0.5 to 7.0 m²/g.

5. The negative electrode for secondary batteries as claimed in claim 1, wherein the active material (A) is one obtained from at least one starting material selected from the group consisting of petroleum cokes and coal cokes and having a non-acicular configuration.

6. A lithium secondary battery containing the negative electrode for secondary batteries of claim 1 as the constitutive element thereof.

7. The lithium secondary battery as claimed in claim 6 having a nonaqueous electrolytic solution and/or a nonaqueous polymer electrolyte, wherein the nonaqueous solvent for these contains at least one selected from ethylene carbonate, diethyl carbonate, dimethyl carbonate, methylethyl carbonate, propylene carbonate, butylene carbonate and vinylene carbonate.

8. An electronic device comprising the lithium secondary battery of claim 6.

9. A tool comprising the lithium secondary battery of claim 6.

10. A vehicle comprising the lithium secondary battery of claim 6.

* * * * *